US006761260B2

(12) United States Patent
Bettini et al.

(10) Patent No.: US 6,761,260 B2
(45) Date of Patent: Jul. 13, 2004

(54) SYSTEM FOR TRANSPORTING CONTAINERS, WHICH IS ESPECIALLY SUITABLE FOR USE IN A PLANT FOR THE PRODUCTION OF PAINTS, VARNISHES AND THE LIKE

(75) Inventors: Massimo Bettini, Marconi (IT); Roberto Avanzi, Massa Finalese (IT)

(73) Assignee: Corob S.p.A., San Felice sul Panaro (IT)

(*) Notice: Subject to any disclaimer, the term of this patent is extended or adjusted under 35 U.S.C. 154(b) by 0 days.

(21) Appl. No.: 10/203,799

(22) PCT Filed: Feb. 14, 2001

(86) PCT No.: PCT/IT01/00066

§ 371 (c)(1),
(2), (4) Date: Nov. 8, 2002

(87) PCT Pub. No.: WO01/60720

PCT Pub. Date: Aug. 23, 2001

(65) Prior Publication Data

US 2003/0127306 A1 Jul. 10, 2003

(30) Foreign Application Priority Data

Feb. 15, 2000  (IT) .................................... BO2000A0064

(51) Int. Cl.[7] ........................ B65G 37/00; B65G 29/00; B65G 47/84; B65G 49/00
(52) U.S. Cl. .................. 198/620; 198/465.1; 198/468.6
(58) Field of Search ............................. 198/774.1, 620, 198/465.1, 468.6

(56) References Cited

U.S. PATENT DOCUMENTS

| 3,789,976 | A | | 2/1974 | Dwight | |
|---|---|---|---|---|---|
| 4,151,907 | A | | 5/1979 | Doty | |
| 4,687,092 | A | * | 8/1987 | Ray | 198/774.1 |
| 4,781,285 | A | * | 11/1988 | Schlatter et al. | 198/774.1 |
| 4,783,889 | A | * | 11/1988 | Hayashi | 198/774.1 |
| RE32,804 | E | * | 12/1988 | Mason | 198/774.1 |
| 5,027,869 | A | * | 7/1991 | Tsumura et al. | 198/774.1 |
| 5,082,419 | A | * | 1/1992 | Kollross et al. | 198/774.1 |
| 5,127,787 | A | | 7/1992 | Beck et al. | |
| 5,454,466 | A | * | 10/1995 | Galarowic | 198/774.1 |

FOREIGN PATENT DOCUMENTS

| EP | 0 333 998 A | 9/1989 |
|---|---|---|
| EP | 0 685 396 A | 12/1995 |

* cited by examiner

Primary Examiner—Gene O. Crawford
(74) Attorney, Agent, or Firm—Sughrue Mion, PLLC

(57) ABSTRACT

A system for transporting containers, which is especially suitable for use in a plant for the production of paints, varnishes and the like, includes a longitudinally extending bearing structure for containers. The structure in turn includes a first, fixed, portion defining one or more fixed bearing surfaces, and a second, movable, portion defining one or more movable bearing surfaces. Handling devices are coupled operatively to the movable portion in order, in use, to bring about coordinated movements of lifting/lowering and longitudinal advance/return of the movable portion relative to the fixed portion.

10 Claims, 3 Drawing Sheets

SYSTEM FOR TRANSPORTING CONTAINERS, WHICH IS ESPECIALLY SUITABLE FOR USE IN A PLANT FOR THE PRODUCTION OF PAINTS, VARNISHES AND THE LIKE

This is a National stage entry under 35 U.S.C. §371 of Application No. PCT/IT01/00066 filed Feb. 14, 2001; the disclosure of which is incorporated herein by reference.

BACKGROUND OF THE INVENTION

The present invention relates to the field of industrial plants for the production of paints, varnishes, enamels, inks and the like, and in particular to a system for handling containers in those plants.

Known types of industrial plant for the production of paints and varnishes usually comprise lines for handling the paint containers which are carried in sequence to processing stations including, for example, stations for filling, for metering and delivering dyes, for mixing, for weighing and checking, and also for packing, storing and/or despatching.

An example of an industrial plant of the type indicated above is described in the document EP-A-0 427 497 which illustrates a conventional container-handling system which comprises tracks having idle and/or motor-driven rollers which transport the containers along predetermined paths. Other transport and handling systems normally used also in other technological fields involve the use of endless and motor-driven conveyor belts, the upper face of which supports the containers which are to be transported from one station of the plant to another.

Another example of a transport system is disclosed in document U.S. Pat. No. 4,151,907 which shows a walking beam conveyor having a cam (32) at only one of its end driving a longitudinally extending beam (26). First and second linkage means (48, 54) move the beam transversely, e.g. vertically, and longitudinally, e.g. horizontally, of the conveyor.

The prior art transport systems have a number of disadvantages, above all the low degree of precision in reaching accurate positions along the production line, which means that it is necessary to adopt often expensive arrangements for ensuring the correct placement of the containers, for example, beneath the delivery nozzles of the dye-dispensing machines. It should be borne in mind that containers for paints and varnishes often have a very small opening on the upper face which is closed with a cap once the container has been filled. The small dimensions of that opening, together with the necessity to deliver correctly often very small amounts of dye to the inside of the container, make it necessary to provide means suitable for ensuring the exact centring of the hole below the delivery nozzle. Given the poor positioning precision of the transport systems of known type, in conventional plants it is necessary to provide a series of additional means at the individual work stations, such as guides, stops, mechanical manipulators, robots, and the like. This naturally involves a complication of the plant both in mechanical terms and in control terms, with a consequent reduction in the reliability, repeatability and quality of production during the prolonged and intensive use for which such plants are intended.

A further disadvantage of the known systems is the inability to manage multi-form production, that is to say, in which the containers have different shapes and dimensions.

Another disadvantage of the transport systems of the prior art, especially for use in plants for the production of paints and varnishes, is the difficulty of keeping such systems clean, above all if a dye product, a varnish or a paint is spilt or upset on them, which could spoil the containers themselves and therefore impair the quality and appearance of the final packaging of the product.

SUMMARY OF THE INVENTION

The object of the present invention is to overcome the disadvantages of the prior art by providing a system for transporting and handling containers which is precise and reliable and which is at the same time economical and simple to produce.

In order to achieve that object, the present invention relates to a system for transporting containers, which is especially suitable for use in a plant for the production of paints, varnishes and the like, characterised in that it comprises a longitudinally extending bearing structure for containers, comprising a first, fixed, portion defining one or more fixed coplanar bearing surfaces, and a second, movable, portion defining one or more movable coplanar bearing surfaces, handling means being connected operatively to the movable portion in order, in use, to bring about coordinated movements of lifting/lowering and longitudinal advance/return of the movable portion relative to the fixed portion.

A particular advantage of the present invention is afforded by the fact that the handling system can be provided in modular form, with segments of predetermined length which can be readily assembled to form portions of transporter of the desired length.

A further advantage of the present invention is provided by the fact that it is readily possible to clean the transport system owing to the substantially planar form of the transport surfaces.

Another advantage of the present invention is that it is possible to predetermine with precision not only the positioning of each individual container along the production line but also the relative distance between one container and another, so as to ensure a correct time sequence in the operation of the individual machines in each work station without having to resort to the extensive and generalised use of presence-sensing means at each work station, which clearly has favourable results as regards the overall economy of the plant, its reliability, and the simplicity of managing the complete production process, especially with the large production volumes for which the plants of the type indicated above are intended.

Yet another advantage of the present invention is provided by the quiet operation of the transport system compared with the prior art systems, owing to the fact that the impacts between the containers and the bearing surfaces are substantially reduced and the risk of contact between the various containers, which remain spaced from one another by a predetermined distance over the entire handling path, are also completely eliminated, thus also reducing the risk of the containers being damaged, in particular dented.

A further advantage of the present invention is provided by the fact that it is also possible to transport and handle simultaneously containers having widely varying dimensions, without having to make any modification to the structure or to the components of the transport system, and while still ensuring optimum precision of advance and positioning along the path of the plant.

A further advantage resides in the fact that it is also possible to produce long transport path segments operated by a single motor, simply by combining and connecting small modular portions which can be readily stored and transported.

Naturally, although the invention has been developed with particular regard to a plant for the production of paints, varnishes and the like, the transport and handling system to which the invention relates could also be used in other technological fields which require just as accurate a system for positioning parts or members within the framework of a production line.

BRIEF DESCRIPTION OF THE DRAWINGS

Further characteristics and advantages will emerge from the following detailed description of a preferred embodiment, with reference to the appended drawings which are given purely by way of non-limiting example and in which.

DETAILED DESCRIPTION OF THE INVENTION

Figure 1:
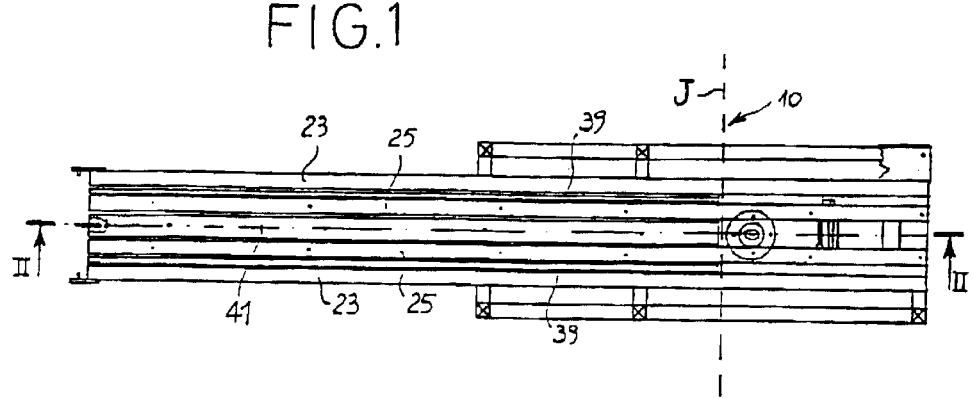
FIG. 1 is a partially sectioned plan view of a modular portion of the transport system according to the present invention, comprising a power unit.
Figure 2:
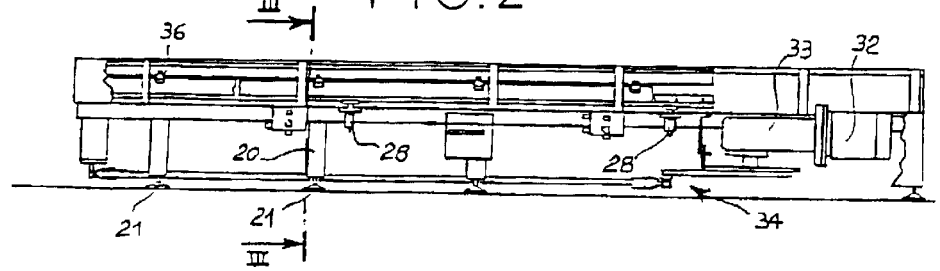
FIG. 2 is a sectioned side view taken on the line II—II in FIG. 1.
Figure 3:
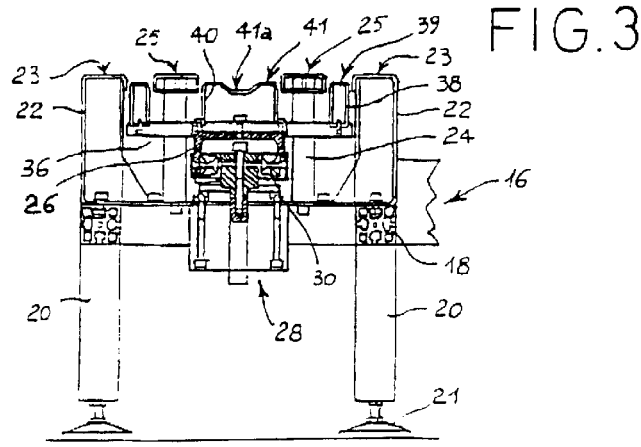
FIG. 3 is a cross-section taken on the line III—III in FIG. 2.

Referring now to the drawings, a system for transporting containers along a production line comprises a succession of modular portions 10, 12, 14 of similar type which, as a whole, determine the path along which a group of containers are transported in succession. In particular, the motor-driven modular portion 10, illustrated in FIGS. 1 to 3, comprises a principal frame structure 16 including longitudinal support bars 18 resting on the ground by way of a plurality of legs 20 having end feet 21 which are adjustable in height. Secured to the principal frame structure 16 are two longitudinal lateral shoulders 22 which define two corresponding outer bearing surfaces 23. Also secured to the principal frame structure are two inner bearing girders 24 which define two corresponding inner bearing surfaces 25 arranged symmetrically relative to the plane of the longitudinal centre line of the modular portion 10.

A handling beam 26 which is slidable both longitudinally and vertically relative to the principal frame structure 16 is arranged along the centre line of the modular portion 10. The beam 26 is supported by a plurality of lifting devices, for example, although this is not to constitute a limitation, by the pneumatic jacks or cylinders 28 illustrated in the drawings, which are secured firmly to the frame structure 16. A sliding system is interposed between the lifting devices 28 and the beam 26 and is, for example, constituted by bearings 30 which enable the beam 26 to slide longitudinally, irrespective of the vertical position it assumes as a result of the cylinders 28 being operated. At one of its ends the beam 26 is coupled to a motor 32, preferably an electrical motor, with the interposition, in addition to an optional reduction gear 33, of a connecting rod and crank mechanism 34 having an eccentric, or of any other type of mechanism normally known by a person skilled in the art which is suitable for transmitting the movement to the beam 26 with conversion thereof from a rotary movement to a linear movement.

Secured along the beam 26 are cross-members 36 on which are mounted intermediate bearing girders 38 which define two corresponding intermediate bearing surfaces 39 which are arranged symmetrically relative to the plane of the longitudinal centre line of the modular portion 10 and which are interposed with play between the lateral surfaces 23 and the inner surfaces 25. The play between the surfaces 23 and 25 is such as to ensure free relative movement between them but it is nevertheless sufficiently small to offer adequate protection against accident to the operators. A longitudinal support structure 40 is also secured to the beam 26 and defines a corresponding median bearing surface 41 having a median duct 41a for collecting any drops of product which might escape from the containers. The intermediate bearing surfaces 39 and the median bearing surface 41 lie substantially in the same horizontal plane which, when the beam 26 has been lowered to the maximum extent, is lower than the horizontal plane in which the lateral bearing surfaces 23 and the inner bearing surfaces 25 lie. The stroke of the lifting means 28 is such that, when the beam 26 has been raised to the maximum extent, the horizontal plane in which the intermediate surfaces 39 and the median surface 41 lie is raised above the horizontal plane in which the lateral bearing surfaces 23 and the inner bearing surfaces 25 lie.

Figure 4:
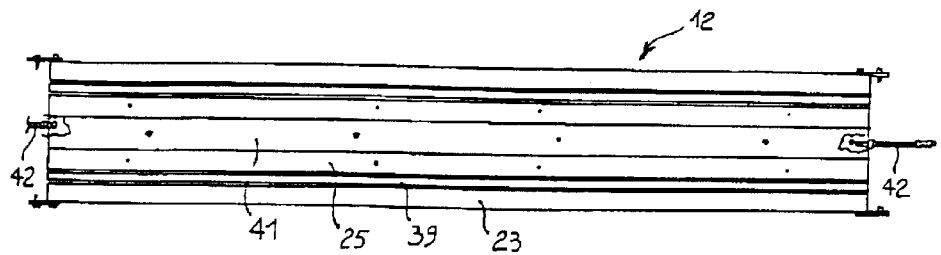
FIG. 4 is a plan view, similar to FIG. 1, of a modular portion of the transport system without a power unit.

Referring now to FIG. 4, the simple modular portion 12, without any independent motorisation in the horizontal direction, but likewise provided with means 28 for lifting the central beam, comprises a structure substantially similar to that of the motor-driven modular portion 10, with the exclusion of the motor 32 and the handling devices connected thereto. Instead, the ends of the modular portion 12 are provided with connecting means 42 which enable the modular portion 12 to be connected to adjacent portions in order to derive from a remote motor-driven modular portion 10 the movement of the central beam and of the structures connected thereto.

Figure 5:
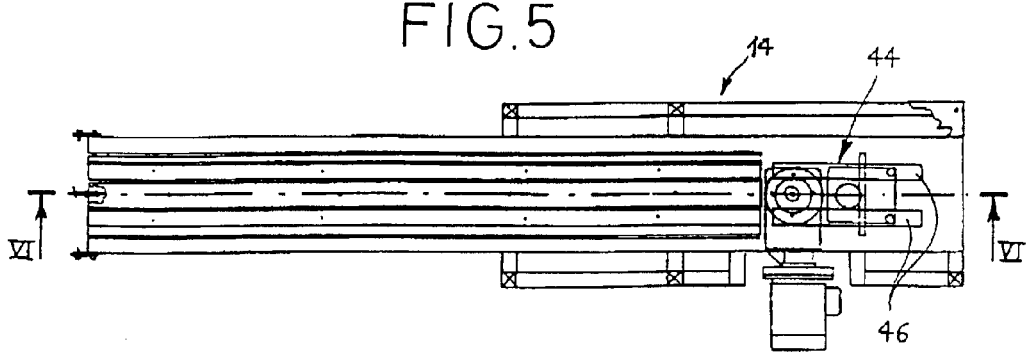
FIG. 5 is a plan view, similar to FIG. 1, of a modular portion with a power unit and a device for rotating the containers.
Figure 6:
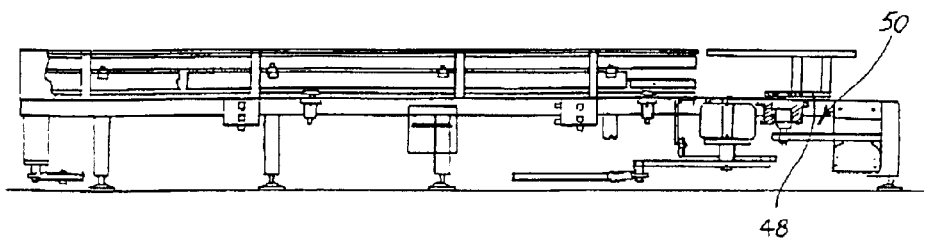
FIG. 6 is a sectioned side view taken on the line VI—VI in FIG. 5.
Figure 7:
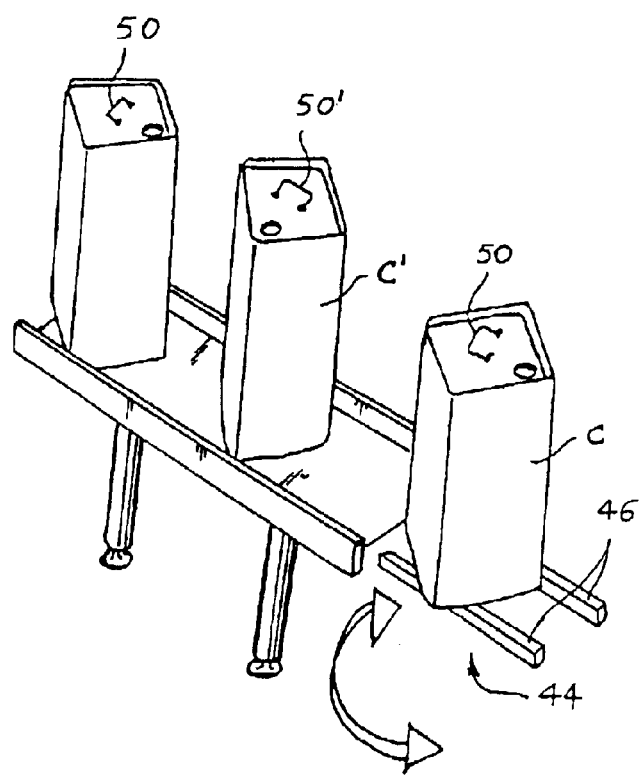
FIG. 7 is a schematic perspective view of a group of containers at the location of a device for rotating the containers.

Referring to FIGS. 5 and 6, the motor-driven modular portion 14 also comprises a device 44 for rotating the containers, which comprises a pair of bearing tracks 46 supported by a platform 48 which is rotatable by means of a mechanism 50, which preferably, although this does not constitute a limitation, includes a pneumatic linear actuator and a bevel gear. Substantially, the tracks 46 lie on the extension of the girders 25.

The modular portions 10, 12, 14 described above can be coupled one behind the other. Preferably, a single motor-driven modular portion 10 or 14 controls a plurality of simple modular portions 12 connected thereto in succession. The lifting means 28 of the various modular portions are generally served by the same power supply, in particular by the same source of compressed air, in order to bring about the simultaneous lifting and lowering of all of the beams 26 of modular portions that are adjacent to one another, and therefore the simultaneous lifting and lowering of all of the intermediate 39 and median 41 bearing surfaces relative to the parallel lateral 23 and intermediate 25 longitudinal bearing surfaces.

The lifting and lowering movement of the beams 26 is coordinated by an external control system (not illustrated in the drawings) with the horizontal sliding movement of the beams 26 and, consequently, of the intermediate 39 and median 41 longitudinal bearing surfaces.

When a series of containers is placed on the transport and handling system formed by the series of modular portions 10, 12, 14 connected adjacent to one another, in an initial stage the bases of the containers rest only on the lateral bearing surfaces 23 and/or on the inner bearing surfaces 25, depending on the transverse dimensions of the containers. The system for controlling the transporter then activates the lifting means 28, in particular, although this is not to constitute a limitation, by bringing about the delivery of compressed air to the pneumatic cylinders 28. The various beams 26 of the modular portions 10, 12, 14 are raised in a manner such that the various intermediate 39 and/or median 41 longitudinal bearing surfaces push simultaneously on the bases of the various containers, lifting them and removing them from the lateral 23 and inner 25 bearing surfaces.

The control system then sends an activating signal to the motor 32 which brings about the longitudinal advance of the beams 26. When the beams have reached the longitudinally advanced position, the control system brings about the deactivation of the lifting means 28 and the consequent lowering of the various intermediate 39 and/or median 41 longitudinal bearing surfaces. Thus, the series of containers is set down gently again on the lateral 23 and/or inner 25 fixed support surfaces, but in a position advanced by a specific amount relative to the starting situation.

When the movable bearing surfaces 39 and 41 have been lowered to such an extent that they no longer support the containers, the control system activates the motor 32 so that it returns the beams 26 into the withdrawn position, in order for the operating cycle to be resumed again from the beginning.

Although the operation of the transport system has been described above with reference to activation and deactivation commands imparted by an external control system, it is nevertheless possible to provide an operating procedure which does not require a complex control logic. It is sufficient to synchronise a continuous alternating movement of lifting and lowering the beams 26, which is brought about by the lifting means 28, with a continuous longitudinal alternating movement of the beams 26 which is brought about, for example, by the connecting rod and crank mechanism connected to the motor 32. The result is a circular or elliptical movement in the vertical plane, in which the horizontal velocity component of the guides 26 is zero at the front and rear dead centres, which coincide with the moment at which all of the fixed 23, 25 and movable 39, 41 bearing surfaces are aligned in a horizontal plane common to the base plane of the various containers.

The rotation device 44, which can be either integrated in the modular portion 14 of FIGS. 5 and 6 or provided as a separate accessory which can be integrated in a transport system constituted by the modular portions 10 and 12, is advantageously used in cases where it is necessary to rotate the containers at a work station, for example so that they can be picked up by a manipulator before a set of mixers. In fact, in many cases it is necessary to orient the containers C, C' in a specific manner so that, for example, although this is not to constitute a limitation, the handles 50, 50' are oriented in predefined directions. In such cases, when the movable surfaces 39, 41 are in the lower position of their movement, the tracks 46 can be rotated about a vertical axis in order to present the containers C, C' in the required position for the subsequent production stages.

In the above description, the unit for operating the handling means in the longitudinal direction of the transport system, comprising the motor 32, the optional reduction gear 33 and the mechanism 34 for converting the movement from rotary to linear, has been described by way of example as forming an integral part of the motor-driven modular portion 10. It will be appreciated that it is possible to provide as mentioned above with regard to the rotation device 44 an independent motor-driven operating unit which can be integrated in a transport system comprising only simple modular portions 12. In that case, the placing of such a motor-driven operating unit close to a simple modular portion 12 would basically assume a configuration analogous to that of the motor-driven modular portion 10 illustrated in FIG. 1, in which the broken line J is intended to indicate the line of the plane joining the motor-driven operating unit (on the right in the Figure) and the simple modular portion connected thereto (on the left in the Figure).

Naturally, the principle of the invention remaining the same, the details of construction and forms of embodiment may be varied widely with respect to those described and illustrated, without thereby departing from the scope of the invention.

What is claimed:

1. A system for transporting containers, which is especially suitable for use in a plant for the production of paints, varnishes and the like, comprising
   a principal structure (16) defining one or more fixed bearing surfaces (23, 25), for directly individual containers,
   a longitudinally extending bearing structure (26, 36, 38, 40) for engaging the individual containers defining one or more movable bearing surfaces (39, 41) for directly engaging the individual containers,
   handling means being operatively connected to the longitudinally extending bearing structure (26, 36, 38, 40) in order, in use, to transport the individual containers along a path, by longitudinal and vertical movements,
   wherein the handling means comprise first operating means (28) for lifting/lowering of the movable bearing surfaces (39, 41) relative to the principal bearing surfaces to raise and lower the individual containers out of and into contact with the fixed bearings surfaces (23, 25), and second operating means (32, 34) in order to bring about movements of longitudinal advance return of the movable bearing surfaces (39, 41) relative to the principle bearing surfaces (23, 25), the second operating means (28) being operable irrespectively of the vertical position assumed by the movable bearing surfaces (39,41).

2. A transport system according to claim 1, characterised in that the one or more principal (23, 25) and movable bearing surfaces (39, 41) are coplanar with one another.

3. A transport system according to claim 1, characterised in that the movement of the movable bearing surfaces (39, 41) relative to the principle bearing surfaces (23, 25) is a generally circular or elliptical movement in a vertical plane.

4. A transport system according to claim 1, characterised in that it comprises at least two fixed and longitudinally parallel bearing surfaces (23, 25) intercalated with at least two longitudinally parallel moveable bearing surfaces (39, 41).

5. A transport system according to claim 1, characterised in that the principal structure (16) comprises two lateral bearing surfaces (23) and two inner bearing surfaces (25), which are arranged symmetrically relative to the plane of the longitudinal centre line of the path defined by the transport system, the movable bearing surfaces comprising two intermediate bearing surfaces (39, each being interposed with transverse play between a lateral bearing surface (23) and an inner bearing surface (25), the movable bearing surfaces also comprising a median bearing surface (41) arranged along the centre line of the transport system and interposed with play between the two fixed inner bearing surfaces.

6. A transport system according to claim 1, characterised in that it comprises modular portions (10, 12, 14) which are arranged longitudinally side by side in succession and each of which comprises the bearing structure (26, 36, 38, 40) and the handling means and which are selectively selected from the group comprising

- simple modular portions,
- motor-driven modular portions comprising power means coupled to the handling means, and
- modular portions for rotation, comprising a device for the selective rotation of a container placed on the bearing structure.

7. A transport system according to claim 1, characterized in that the longitudinally extending bearing structure comprises an elongate beam structure mounted on the principle portion (16) with the interposition of lifting means (28) and mounted to be slidable longitudinally relative to those lifting means (28).

8. A transport system according to claim 7, characterised in that the beam structure is connected to means of longitudinal translation (32, 34) of the connecting rod and crank type.

9. A transport system according to claim 1, characterised in that it comprises modular portions (10, 12, 14) which are arranged longitudinally side by side in succession and each of which comprises the bearing structure and the handling means, at least one of the modular portions being adjacent to and coupled to a motor-driven operating unit comprising power means and means of coupling to the handling means of the at least one adjacent modular portion.

10. A transport system according to claim 9, characterised in that the bearing structure of any module portions (10, 12, 14) comprises a third portion (48) mounted for rotation relative to the fixed portion of the principal structure (16) about a vertical axis.

* * * * *